(12) United States Patent
Omori

(10) Patent No.: US 11,306,771 B2
(45) Date of Patent: Apr. 19, 2022

(54) RADIAL FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

(*) Notice: Subject to any disclaimer, the term of this patent is extended or adjusted under 35 U.S.C. 154(b) by 0 days.

(21) Appl. No.: 16/493,119

(22) PCT Filed: Mar. 14, 2018

(86) PCT No.: PCT/JP2018/009980
§ 371 (c)(1),
(2) Date: Sep. 11, 2019

(87) PCT Pub. No.: WO2018/168932
PCT Pub. Date: Sep. 20, 2018

(65) Prior Publication Data
US 2020/0124087 A1    Apr. 23, 2020

(30) Foreign Application Priority Data
Mar. 15, 2017   (JP) .............. JP2017-050128

(51) Int. Cl.
F16C 17/02 (2006.01)
F16C 27/02 (2006.01)

(52) U.S. Cl.
CPC ............ F16C 17/024 (2013.01); F16C 27/02 (2013.01)

(58) Field of Classification Search
CPC .................. F16C 17/024; F16C 27/02
See application file for complete search history.

(56) References Cited

U.S. PATENT DOCUMENTS

| | | |
|---|---|---|
| 4,208,076 A | 6/1980 | Gray et al. |
| 5,228,785 A | 7/1993 | Saville et al. |
| 5,658,079 A | 8/1997 | Struziak et al. |
| 5,902,049 A | 5/1999 | Heshmat |
| 6,354,741 B1 | 3/2002 | Saville et al. |
| 9,568,042 B2 * | 2/2017 | Omori .................. F16C 27/02 |
| 2001/0028752 A1 | 10/2001 | Matsushima |
| 2003/0012466 A1 | 1/2003 | Shimizu et al. |
| 2003/0169951 A1 | 9/2003 | Nishijima et al. |
| 2005/0111767 A1 | 5/2005 | Ishii et al. |
| 2005/0163407 A1 | 7/2005 | Kang et al. |
| 2008/0205803 A1 | 8/2008 | Kato et al. |
| 2008/0253704 A1 | 10/2008 | Struziak et al. |
| 2011/0243485 A1 | 10/2011 | Kume et al. |
| 2012/0027327 A1 | 2/2012 | McAuliffe et al. |
| 2014/0376844 A1 | 12/2014 | Swanson et al. |

(Continued)

FOREIGN PATENT DOCUMENTS

| | | |
|---|---|---|
| CN | 101054995 A | 10/2007 |
| CN | 102003463 A | 4/2011 |

(Continued)

Primary Examiner — James Pilkington

(57) ABSTRACT

The radial foil bearing (3, 3A, 3B, 3D) includes: a wave sheet-shaped back foil (11); and an intermediate foil (10) supported by the back foil, and the intermediate foil includes a flat portion (10b) facing a hill part (11c) of a wave sheet shape of the back foil, and a protruding part (39, 40, 40a, 40b, 40B) protruding toward the back foil via branching at a position in a circumferential direction between a top of at least one hill part and a top of a hill part adjacent to the one hill part in the wave sheet shape of the back foil.

5 Claims, 11 Drawing Sheets

(56) References Cited

U.S. PATENT DOCUMENTS

2016/0010682 A1 1/2016 Omori
2016/0377114 A1 12/2016 Dahinten

FOREIGN PATENT DOCUMENTS

| | | |
|---|---|---|
| CN | 102434580 A | 5/2012 |
| CN | 104471260 A | 3/2015 |
| CN | 104632871 A | 5/2015 |
| EP | 0 490 443 A1 | 6/1992 |
| EP | 2 876 316 A1 | 5/2015 |
| EP | 2 473 749 B1 | 12/2015 |
| JP | S61-038323 U | 3/1986 |
| JP | H10-504094 A | 4/1998 |
| JP | H10-331846 A | 12/1998 |
| JP | 2001-295836 A | 10/2001 |
| JP | 2002-364643 A | 12/2002 |
| JP | 2002-372042 A | 12/2002 |
| JP | 2003-148461 A | 5/2003 |
| JP | 2005-113941 A | 4/2005 |
| JP | 2008-261496 A | 10/2008 |
| JP | 2011-208785 A | 10/2011 |
| JP | 2012-031995 A | 2/2012 |
| JP | 2014-020463 A | 2/2014 |
| JP | 2017-015254 A | 1/2017 |
| KR | 10-2008-0064579 A | 7/2008 |
| WO | 2014/014036 A1 | 1/2014 |

\* cited by examiner

RADIAL FOIL BEARING

TECHNICAL FIELD

The present disclosure relates to a radial foil bearing.

Priority is claimed on Japanese Patent Application No. 2017-050128, filed Mar. 15, 2017, the content of which is incorporated herein by reference.

BACKGROUND

Heretofore, as a bearing for a high speed rotating body, a radial bearing is known which is used in a state of encircling a rotary shaft. As such a radial bearing, a radial foil bearing is well known which includes a thin sheet-shaped top foil forming a bearing surface, a back foil elastically supporting the top foil, and a cylindrical bearing housing accommodating the top foil and the back foil. As the back foil of the radial foil bearing, a bump foil obtained by forming a thin sheet into a wave sheet shape is mainly used.

In such a radial foil bearing, an intermediate foil is inserted between the top foil and the back foil for the purpose of "improving the damping effect due to friction between foils", "increasing the rigidity of the top foil" or the like (refer to, for example, Patent Document 1). The intermediate foil is formed into a thin sheet shape, elastically contacts the tops of hill parts of the wave sheet-shaped bump foil, and causes energy dissipation due to friction through sliding with respect to the tops, thereby damping the film-pressure fluctuation. That is, it is possible to limit axial vibration (self-excited vibration) of the rotary shaft by this damping effect and to easily settle the axial vibration.

In addition, Patent Document 2 discloses a radial foil bearing.

DOCUMENT OF RELATED ART

Patent Document

[Patent Document 1] Japanese Unexamined Patent Application, First Publication No. 2014-20463

[Patent Document 2] Japanese Unexamined Utility Model Application No. S61-38323

SUMMARY

Technical Problem

An object of the present disclosure is to improve the damping effect due to the friction between the intermediate foil and the back foil described above.

Solution to Problem

In order to solve the above problems, a radial foil bearing of one aspect of the present disclosure includes: a wave sheet-shaped back foil; and an intermediate foil supported by the back foil, and the intermediate foil includes a flat portion facing a hill part of a wave sheet shape of the back foil, and a protruding part protruding toward the back foil via branching at a position in a circumferential direction between a top of at least one hill part and a top of a hill part adjacent to the one hill part in the wave sheet shape of the back foil.

In the above aspect of the present disclosure, the flat portion of the intermediate foil may be provided with a first branching position at a position in the circumferential direction between a top of at least one hill part and a top of a hill part adjacent to the one hill part in the wave sheet shape of the back foil, and the protruding part may include a first branching part extending from the first branching position.

In the above aspect of the present disclosure, the flat portion of the intermediate foil may be provided with a second branching position, different from the first branching position, at a position in the circumferential direction between a top of at least one hill part and a top of a hill part adjacent to the one hill part in the wave sheet shape of the back foil, and the protruding part may include a second branching part extending from the second branching position.

In the above aspect of the present disclosure, the first branching part may include a separating part separating radially outward from the flat portion, and an approaching part extending from the separating part and approaching radially inward toward the flat portion.

In the above aspect of the present disclosure, the flat portion of the intermediate foil may be provided with a pair of branching positions, a branching position of the pair of branching positions being at a position in the circumferential direction between a top of at least one hill part and each top of hill parts adjacent to both sides of the one hill part in the wave sheet shape of the back foil, and the protruding part may include a pair of branching parts extending from the pair of branching positions.

Effects

According to the present disclosure, it is possible to improve the damping effect due to friction between an intermediate foil and a back foil.

DESCRIPTION OF EMBODIMENTS

Hereinafter, the radial foil bearing of the present disclosure will be described in detail with reference to the drawings.

Figure 1:
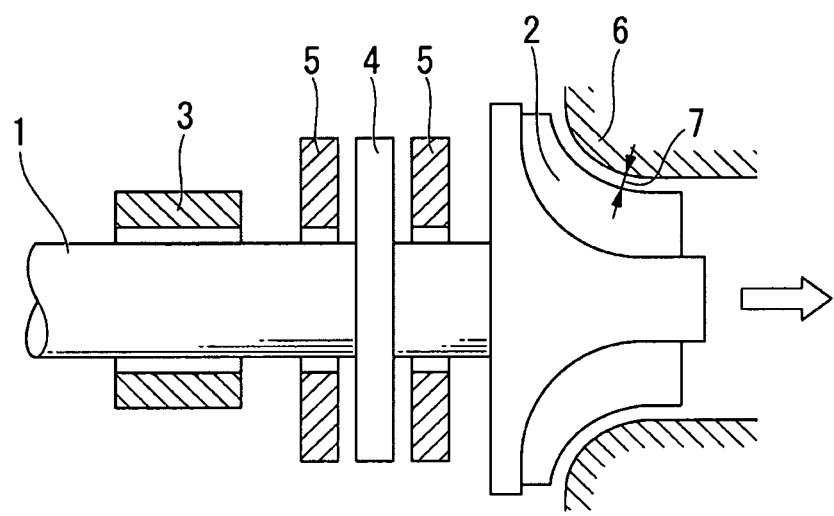
FIG. 1 is a side view showing an example of a turbo machine to which a radial foil bearing of the present disclosure is applied.

FIG. 1 is a side view showing an example of a turbo machine to which a radial foil bearing of the present disclosure is applied. The reference sign 1 in FIG. 1 represents a rotary shaft, the reference sign 2 represents an impeller provided at one end in the axial direction of the rotary shaft, and the reference sign 3 represents the radial foil bearing of the present disclosure. Although only one radial foil bearing is shown in FIG. 1 omitting another bearing, in general, two radial foil bearings are provided in the axial direction of the rotary shaft 1 to configure a support structure for the rotary shaft 1. Therefore, two radial foil bearings 3 are also provided in this embodiment.

The radial foil bearing 3 encircles the rotary shaft 1, that is, the rotary shaft 1 is inserted therethrough. A thrust collar 4 is provided on the rotary shaft 1 between the impeller 2 and the radial foil bearing 3. Thrust bearings 5 are disposed on both sides of the thrust collar 4 in the axial direction so as to face the thrust collar 4, that is, the shaft is inserted through the thrust bearings 5.

The impeller 2 is disposed inside a housing 6 that is the stationary portion, and a tip clearance 7 is provided between the impeller 2 and the housing 6.

First Embodiment

Figure 2:
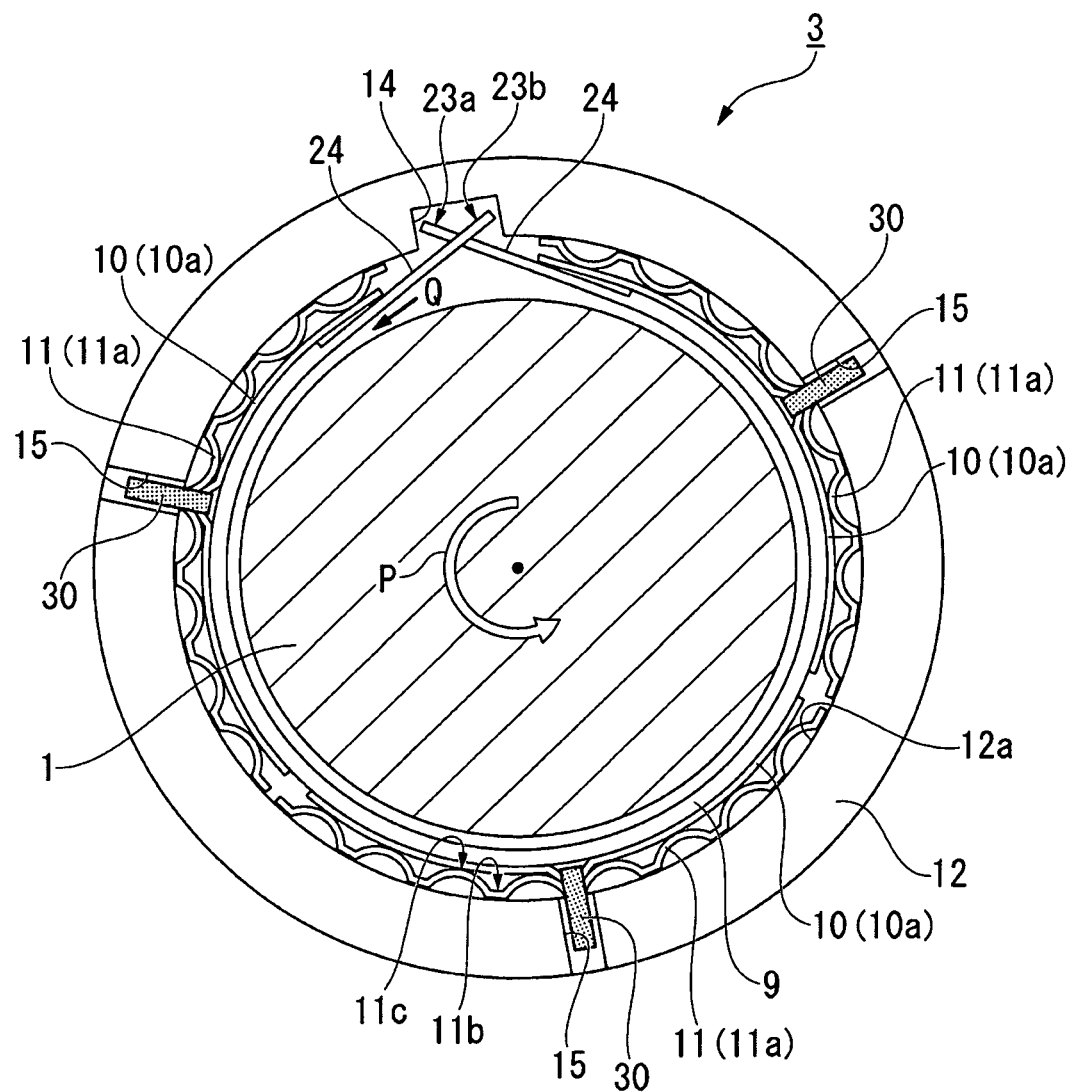
FIG. 2 is a diagram showing a first embodiment of the radial foil bearing of the present disclosure.

FIG. 2 is a diagram showing a first embodiment of the present disclosure. As shown in FIG. 2, a radial foil bearing 3 of the first embodiment is a cylindrical bearing provided with an insertion hole 12a, encircling and supporting the rotary shaft 1.

A direction parallel to the central axis of the radial foil bearing 3 (namely, the central axis of the insertion hole 12a) is referred to as an axial direction, a direction crossing the central axis is referred to as a radial direction, and a direction around the central axis is referred to as a circumferential direction.

The radial foil bearing 3 is configured including a cylindrical top foil 9 (namely, the top foil 9 encircling a circumferential side surface (outer circumferential surface) of the rotary shaft 1) disposed to face the circumferential side surface of the rotary shaft 1, an intermediate foil 10 disposed on radially outside of the top foil 9, a back foil 11 disposed on radially outside of the intermediate foil 10, and a bearing housing 12 (housing) disposed on radially outside of the back foil 11.

The bearing housing 12 is a cylindrical member that configures the outermost part of the radial foil bearing 3. The side surface of the bearing housing 12 is provided with the insertion hole 12a (a hole causing the bottom surface and the top surface of the cylindrical member to communicate with each other), and the rotary shaft 1 is inserted through the insertion hole 12a. The back foil 11, the intermediate foil 10, and the top foil 9 are arranged in this order radially inward from outside between the bearing housing 12 and the rotary shaft 1. That is, the back foil 11, the intermediate foil 10, and the top foil 9 are accommodated in the insertion hole 12a of the bearing housing 12. Thus, the back foil 11 is supported by an inner circumferential surface of the insertion hole 12a, the intermediate foil 10 is supported by the back foil 11, and the top foil 9 is supported by the intermediate foil 10. The bearing housing 12 may be a member other than a cylindrical member (for example, a square post) as long as the insertion hole 12a is provided therein. A groove 14 is formed on the inner circumferential surface of the insertion hole 12a of the bearing housing 12 in the axial direction of the bearing housing 12. That is, the groove 14 is formed on the inner circumferential surface of the bearing housing 12 on the entire length in the axial direction of the bearing housing 12. In other words, in a cross-section of the bearing housing 12 in a direction orthogonal to the axial direction of the insertion hole 12a, the inner circumferential surface is provided with a recess that is recessed radially outward. The groove 14 can accommodate ends of the top foil 9.

As shown in FIG. 2, a pair of engagement grooves 15 extending radially outward from the inner peripheral edge of the insertion hole 12a are formed in both side surfaces (end surfaces in the axial direction) of the bearing housing 12. The engagement groove 15 of this embodiment is formed at each of positions by which the side surface of the bearing housing 12 is divided into approximately three areas in the circumferential direction. That is, three pairs of the engagement grooves 15 are provided in the bearing housing 12 of this embodiment. Engagement members 30 described later engage with the engagement grooves 15. In this embodiment, the groove 14 is disposed between two pairs of engagement grooves 15 among the three pairs of the engagement grooves 15. In addition, one pair of engagement grooves 15 faces the groove 14 in the radial direction. In order to form the engagement grooves 15, cutting machining with an end mill, electrolytic machining, wire-cut electric discharge machining or the like can be appropriately used. In addition, the engagement groove 15 may not be formed to penetrate from the inner peripheral edge to the outer peripheral edge of the bearing housing 12. For example, the engagement groove 15 may open only at the inner circumferential surface of the bearing housing 12.

Figure 3A:
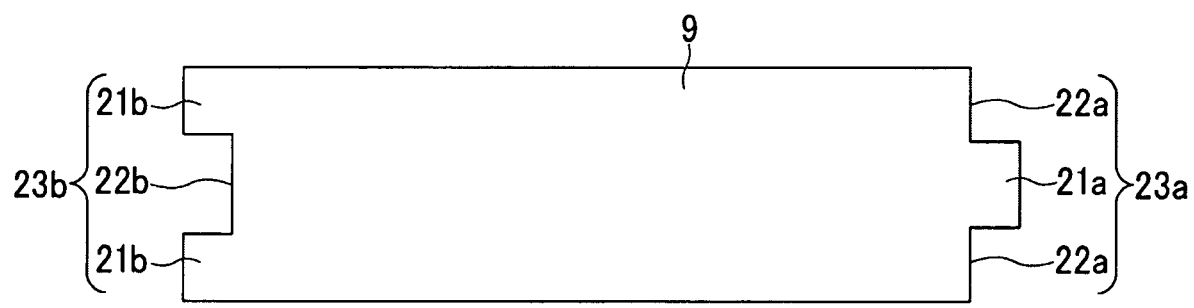
FIG. 3A is a development view of a top foil provided in the radial foil bearing shown in FIG. 2.

The top foil 9 is cylindrically wound along the inner surface of the intermediate foil 10 and is arranged such that a first uneven portion 23a formed in one end of the top foil 9 and a second uneven portion 23b formed in another end thereof engage with the groove 14 formed in the bearing housing 12. As shown in FIG. 3A that is a development view of the top foil 9, the top foil 9 is formed by winding a rectangular metal foil whose long side is in the bearing circumferential direction and whose short side is in the bearing length direction (the axial direction), and the metal foil is cylindrically wound in the arrow direction (the length direction of the long side; the bearing circumferential direction) in FIG. 3B that is a side view of the top foil 9.

As shown in FIG. 3A, the first uneven portion 23a including one protruding part 21a and two recessed parts 22a is formed in one side (short side) of the top foil 9, and the second uneven portion 23b including two protruding parts 21b and one recessed part 22b is formed in another side (short side) thereof opposite to the one side (short side). The recessed part 22b of the second uneven portion 23b is formed corresponding to the protruding part 21a of the first uneven portion 23a, and the recessed parts 22a of the first uneven portion 23a are formed corresponding to the protruding parts 21b of the second uneven portion 23b.

That is, the recessed part 22b of the second uneven portion 23b is formed such that the protruding part 21a passes through the recessed part 22b, when the top foil 9 is cylindrically wound such that the first uneven portion 23a and the second uneven portion 23b overlap each other. Similarly, the recessed parts 22a of the first uneven portion 23a are formed such that the protruding parts 21b pass through the recessed parts 22a, when the top foil 9 is cylindrically wound.

As shown in FIG. 2, the protruding parts 21a and 21b passed through the recessed parts 22b and 22a, respectively, are pulled out toward the bearing housing 12, and the end parts of the protruding parts 21a and 21b are accommodated in the groove 14 of the bearing housing 12 (the ends of the top foil 9 are in contact with and held by inner wall surfaces of the groove 14). That is, both ends in the circumferential direction of the top foil 9 are held by an inner circumferential surface of the insertion hole 12a of the bearing housing 12. The top foil 9 is arranged such that the ends thereof contact inner surfaces of the groove 14.

Figure 3B:
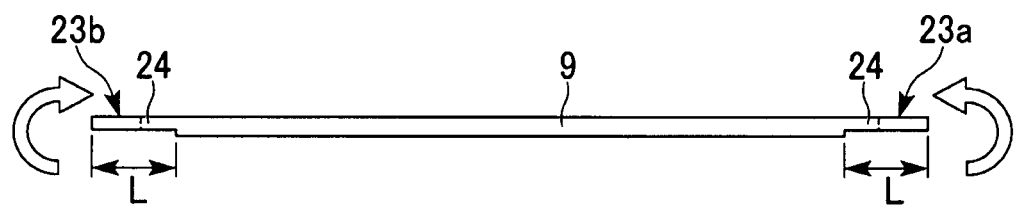
FIG. 3B is a side view showing, in a flattened manner, the top foil provided in the radial foil bearing shown in FIG. 2.

As shown in FIG. 3B, the top foil 9 is provided with thin portions 24 at a side (the one side) thereof on which the first uneven portion 23a is formed and at a side (the other side) thereof on which the second uneven portion 23b is formed, and the thin portions 24 are thinner than a central portion of the top foil 9 between the sides. As shown in FIG. 2, each of these thin portions 24 is formed to be thin (thinned) such that the outer circumferential surface (the surface close to the bearing housing 12) thereof is recessed compared to the outer circumferential surface of the central portion.

The thin portion 24 is formed to have a desired thickness (thinness) by controlling the thickness of both ends of the top foil 9 in the order of 10 μm through, for example, etching. Specifically, in a case where the bearing diameter is 35 mm, when the thickness of the top foil 9 is 100 μm, the thickness of the thin portion 24 is about 80 μm.

As shown in FIG. 2, the length L in the circumferential direction of the thin portion 24 shown in FIG. 3B is a length corresponding to the groove 13 and one hill part 11c of an end of the back foil 11. In addition, the length L in the circumferential direction of the thin portion 24 may be a length corresponding to the groove 14 and about three hill parts 11c of the end of the back foil 11, instead of the example shown in FIG. 2.

As shown in FIG. 2, the back foil 11 is disposed on the inner circumferential surface of the insertion hole 12a of the bearing housing 12. The back foil 11 is formed of a foil (thin sheet) and elastically supports the intermediate foil 10 and the top foil 9. For such a back foil 11, for example, a bump foil, a spring foil described in Japanese Unexamined Patent Application, First Publication No. 2006-57652, Japanese Unexamined Patent Application, First Publication No. 2004-270904 or the like, or a back foil described in Japanese Unexamined Patent Application, First Publication No. 2009-299748 or the like is used. In this embodiment, a bump foil is used for the back foil 11. However, the spring foil or the back foil described above may be used for the back foil of the present disclosure.

In the present disclosure, the back foil 11 is configured of three (a plurality of) back foil pieces 11a disposed in the circumferential direction of the bearing housing 12. In each of these back foil pieces 11a, a foil (thin sheet) is formed into a wave sheet shape in the circumferential direction. In addition, the back foil piece is formed such that the side shape thereof viewed in the axial direction becomes a substantially arc shape as a whole. In the present disclosure, all of the three back foil pieces 11a are formed to have equal shape and size. Therefore, these back foil pieces 11a are arranged to divide the inner circumferential surface of the bearing housing 12 into approximately three areas. The number of the back foil pieces configuring the back foil 11 may be appropriately changed.

In addition, the "wave sheet shape" in this embodiment is not limited to a shape configured only of curved surfaces (for example, a sine wave), but denotes a shape in which a radially inward protruding part and a radially outward protruding part are alternately disposed in the circumferential direction. The shape may have a flat portion, namely a linearly extending portion, when viewed in the axial direction and may be configured by combining a plurality of flat portions together.

The back foil pieces 11a at positions between which the groove 14 is interposed are arranged with a gap. On the other hand, at the other positions, the ends of the back foil pieces 11a are arranged to be close to each other (with a gap less than the gap in which the groove 14 is positioned). That is, the back foil piece 11a does not extend to the position in the circumferential direction of the groove 14. By such a configuration, the three back foil pieces 11a are formed in a substantially cylindrical shape as a whole and are disposed along the inner circumferential surface of the bearing housing 12. That is, when the back foil piece 11a is viewed in the axial direction, hill parts 11c protruding radially inward and valley parts 11b protruding radially outward compared to the hill parts 11c are alternately formed in the circumferential direction.

The valley part of this embodiment includes the flat valley part 11b facing the bearing housing 12. The flat valley part 11b can contact the inner circumferential surface of the insertion hole 12a. In addition, the hill part 11c can contact the intermediate foil 10 (an intermediate foil piece 10a described later). Therefore, the back foil piece 11a elastically supports the top foil 9 via the intermediate foil piece 10a, particularly using the hill parts 11c contacting the intermediate foil piece 10a (the intermediate foil 10).

In addition, fluid passageways in the radial direction of the radial foil bearing 3 are formed by the hill parts 11c or the valley parts 11b. Furthermore, both ends in the circumferential direction of the back foil piece 11a of this embodiment are the valley parts.

Figure 4:
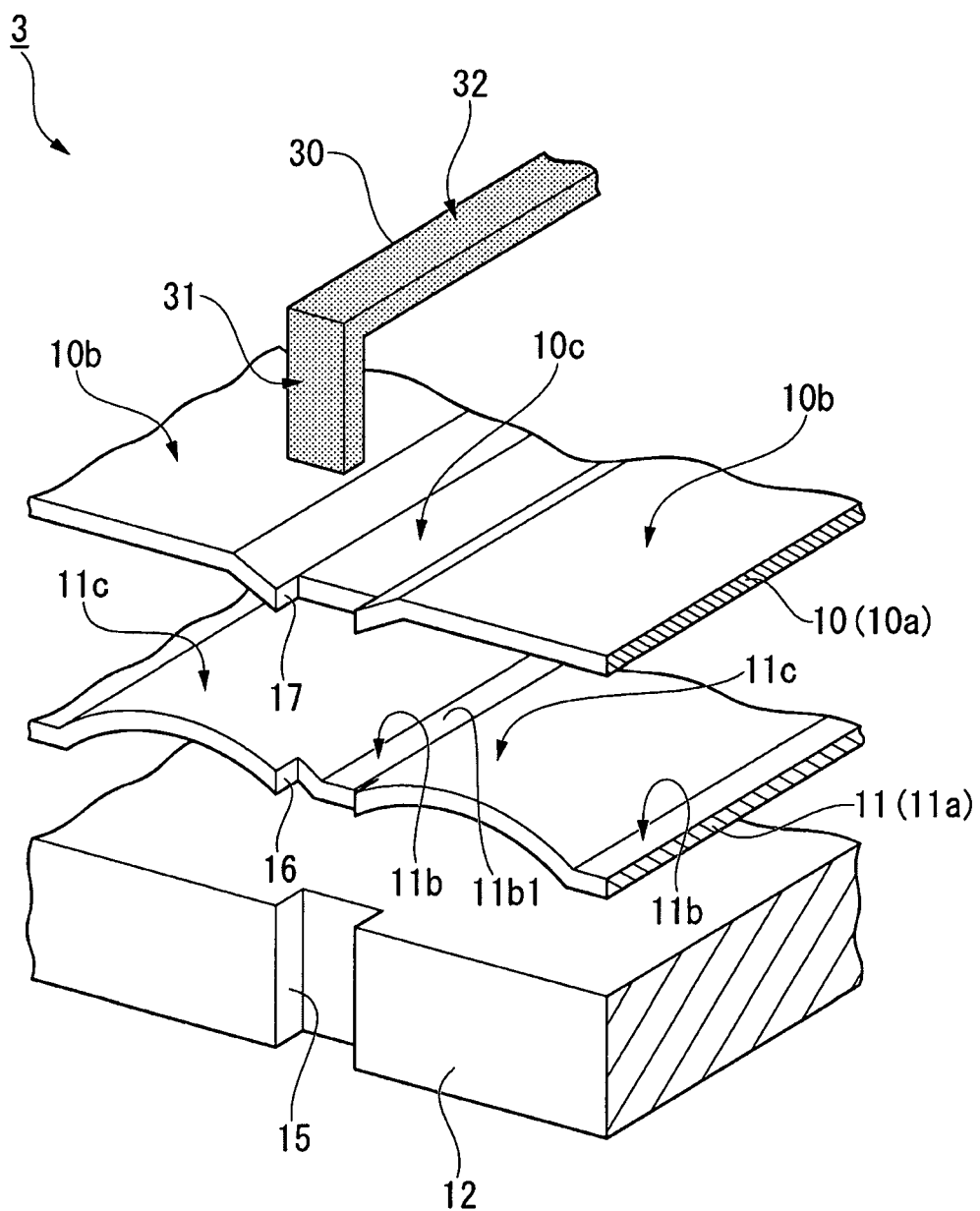
FIG. 4 is a perspective view showing an important part of the radial foil bearing shown in FIG. 2.
Figure 5A:
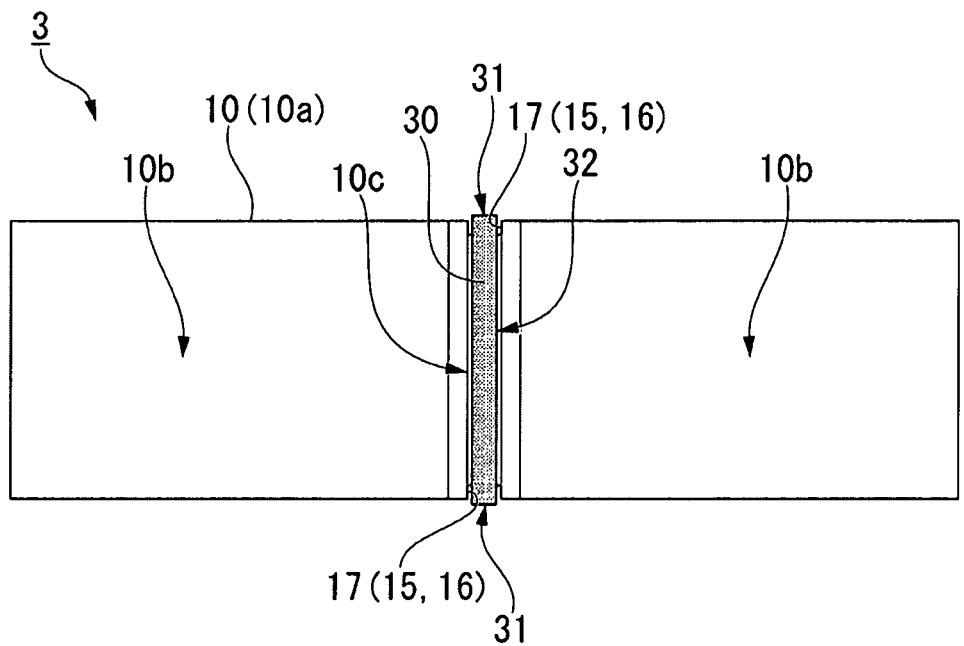
FIG. 5A is a diagram schematically showing, in a flattened manner, the important part of the radial foil bearing shown in FIG. 2.

FIG. 5A is a diagram schematically showing an important part of FIG. 2 in a flattened manner. A cutout 16 is formed in each of edges of both ends in the axial direction of a portion (the central portion in a direction parallel to the circumferential direction of the bearing housing 12) of each back foil piece 11a between both ends thereof in the circumferential direction. That is, a position of the edge extending in the circumferential direction of the back foil piece 11a, which is between both ends thereof in the circumferential direction, is provided with a recess that is recessed toward the central position thereof in the axial direction. As shown in FIG. 4, the cutout 16 is formed in the valley part 11b of the back foil piece 11a. The cutout 16 of this embodiment is formed by cutting out an area including the valley part 11b and root parts of the hill parts 11c adjacent to each other across the valley part 11b, toward the center in the axial direction of the bearing housing 12. That is, the cutout 16 is formed in a position extending in the circumferential direction and including the valley part 11b. The cutout 16 is formed at a position corresponding to the engagement groove 15 of the bearing housing 12, that is, a position overlapping the engagement groove 15. The width in the circumferential direction of the cutout 16 is formed to be the same as the width in the circumferential direction of the engagement groove 15.

As shown in FIG. 2, the intermediate foil 10 is disposed between the top foil 9 and the back foil 11 configured of the three back foil pieces 11a and in this embodiment, is configured of three intermediate foil pieces 10a arranged in the circumferential direction of the bearing housing 12. As shown in FIG. 5A, the intermediate foil piece 10a is formed such that the developed shape thereof becomes a substantially rectangular shape, and is curved at a predetermined curvature such that a substantially cylindrical shape is formed of the three intermediate foil pieces 10a, thereby having an arc shape in side view. Each intermediate foil piece 10a of this embodiment faces the hill parts 11c of the back foil piece 11a in the radial direction.

That is, the intermediate foil piece 10a can come into contact with the hill parts 11c disposed at positions in the circumferential direction closest to both ends in the circumferential direction of the back foil piece 11a. Moreover, the separation distance in the circumferential direction between the back foil pieces 11a adjacent to each other without the groove 14 disposed therebetween is less than the separation distance in the circumferential direction between the intermediate foils 10 corresponding to the back foil pieces 11a and positioned on radially inside of the back foil pieces 11a.

As can be understood from the disclosure to this point, the radial foil bearing 3 of this embodiment includes the top foil 9 formed of one sheet of foil, the back foil 11 formed of three sheets of foil, and the intermediate foil 10 formed of three sheets of foil. The number of the intermediate foil pieces configuring the intermediate foil 10 may be appropriately changed.

Figure 5B:
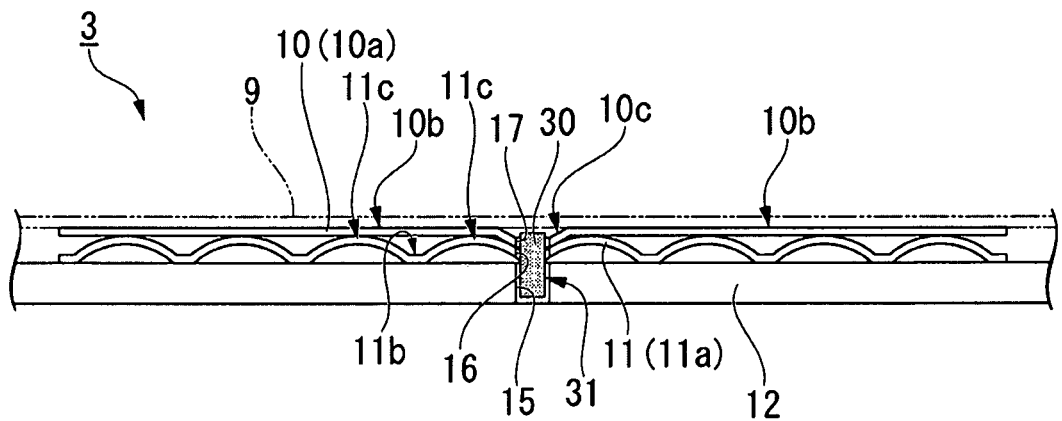
FIG. 5B is a side view showing, in a flattened manner, the important part of the radial foil bearing shown in FIG. 2.

As shown in FIGS. 5A and 5B, the intermediate foil piece 10a includes flat portions 10b that contact the tops of the hill parts 11c of the back foil 11, and a recess 10c (protruding part) that is recessed (protrudes) radially outward compared to the flat portions 10b.

The recess 10c is formed so as to be recessed radially outward from the radially inner surface of the intermediate foil piece 10a and to protrude radially outward from the radially outer surface of the intermediate foil piece 10a.

That is, the recess 10c is away from the top foil 9. As shown in FIG. 5A, the recess 10c is formed at a position in the circumferential direction between both ends in the circumferential direction of the intermediate foil piece 10a. The recess 10c of this embodiment includes a bottom positioned radially outward and being flat in the circumferential direction, and tapered parts positioned on both ends in the circumferential direction of the bottom and extending radially inward. That is, the recess 10c extends radially inward from the bottom as it goes away from the bottom in the circumferential direction. The separation in the circumferential direction between the tapered parts of the recess 10c gradually decreases radially outward from the radially inner side thereof. In addition, the width in the circumferential direction of the bottom of the recess 10c is greater than the width in the circumferential direction of the valley part 11b of the back foil piece 11a. In this embodiment, the valley part 11b is formed to be flat. However, if the hill part 11c and the valley part 11b have one peaks and are periodically (namely, sinusoidally) formed, then the width in the circumferential direction of the valley part 11b in the present disclosure is considered to be the dimension of the valley part 11b of the back foil piece 11a at the position in the radial direction of the middle between the peak of the hill part 11c and the peak of the valley part 11b. The outer shape of the intermediate foil piece 10a has substantially the same size as the outer shape of the back foil piece 11a. All of the three intermediate foil pieces 10a are formed to have equal shape and size. Therefore, these intermediate foil pieces 10a are disposed to divide the inner circumferential surface of the bearing housing 12 into approximately three areas.

The intermediate foil pieces 10a are disposed at positions corresponding to the back foil pieces 11a. The intermediate foil pieces 10a at positions between which the groove 14 is interposed are disposed with a gap. The intermediate foil pieces 10a at the other positions are disposed such that the ends thereof are close to each other. That is, in this embodiment, the valley parts 11b positioned at both ends of the back foil piece 11a do not reach the position in the circumferential direction of the groove 14. The intermediate foil pieces do also not reach the position in the circumferential direction of the groove 14. The thickness of the intermediate foil piece 10a is less than that of the back foil piece 11a. The rigidity of the intermediate foil 10 is less than or equal to half the rigidity of the back foil 11. By such a configuration, the three intermediate foil pieces 10a are formed in a substantially cylindrical shape as a whole and are disposed to be supported by the back foil 11 along the inner circumferential surface of the bearing housing 12.

As shown in FIG. 5A, a cutout 17 is formed in each of edges of both ends in the axial direction of a portion (the central portion in a direction parallel to the circumferential direction of the bearing housing 12) of each intermediate foil piece 10a between both ends thereof in the circumferential direction. That is, a position of the edge extending in the circumferential direction of the intermediate foil piece 10a, which is between both ends thereof in the circumferential direction, is provided with a recess that is recessed toward the central position in the axial direction. As shown in FIG. 4, the cutout 17 is formed in the recess 10c of the intermediate foil piece 10a. The cutout 17 of this embodiment is formed by cutting out part of the bottom of the recess 10c formed between the flat portions 10b, toward the center in the axial direction of the bearing housing 12 from the side edge.

The cutout 17 is formed at a position corresponding to the engagement groove 15 of the bearing housing 12 and to the cutout 16 of the back foil piece 11a, namely, a position overlapping the engagement groove 15 and the cutout 16, and the width in the circumferential direction of the cutout 17 is formed to be the same as the width in the circumferential direction of each of the engagement groove 15 and the cutout 16.

An engagement member 30 engages with the engagement groove 15 and the cutouts 16 and 17. As shown in FIGS. 5A and 5B, the engagement member 30 includes a pair of engagement legs 31 extending radially outward and a connection portion 32 extending in the axial direction, and the connection portion 32 connects the pair of engagement legs 31 to each other. One of the engagement legs 31 engages with the engagement groove 15 and the cutouts 16 and 17 on one side of the radial foil bearing 3, and the other of the engagement legs 31 engages with the engagement groove 15 and the cutouts 16 and 17 on the other side of the radial foil bearing 3. That is, the engagement leg 31 is inserted in the engagement groove 15.

As shown in FIG. 5B, the length in the radial direction of the engagement leg 31 is approximately equal to the sum of the thickness of the bearing housing 12, the thickness of the back foil piece 11a, and the thickness of the intermediate foil piece 10a. The width of the engagement leg 31 is approximately equal to the width of each of the engagement groove 15 and the cutouts 16 and 17. That is, as shown in FIG. 4, the connection portion 32 is disposed inside the valley part 11b at the central portion in the circumferential direction of the back foil piece 11a and inside the recess 10c of the intermediate foil piece 10a.

By such a configuration, since the engagement leg 31 engages with the engagement groove 15 of the bearing housing 12, the cutout 16 of the back foil piece 11a, and the cutout 17 of the intermediate foil piece 10a, the engagement member 30 serves as a holding member (retainer) that holds the intermediate foil piece 10a and the back foil piece 11a on the bearing housing 12. In addition, the connection portion 32 of the engagement member 30 is covered with the top foil 9. In other words, the connection portion 32 is held between the bottom of the recess 10c of the intermediate foil 10 and the top foil 9.

The engagement leg 31 and the connection portion 32 of the engagement member 30 may be in the shape of a square pole as shown in FIG. 4 or may be in the shape of a column (round bar). The thickness of the engagement member 30 is set such that the connection portion 32 is arranged to be separated from the top foil 9 without contacting the top foil 9. The engagement member 30 can be formed, for example, by etching a metal foil made of stainless steel or the like into a U-shape. It can also be formed by bending a wire-shaped metal rod.

Figure 6:
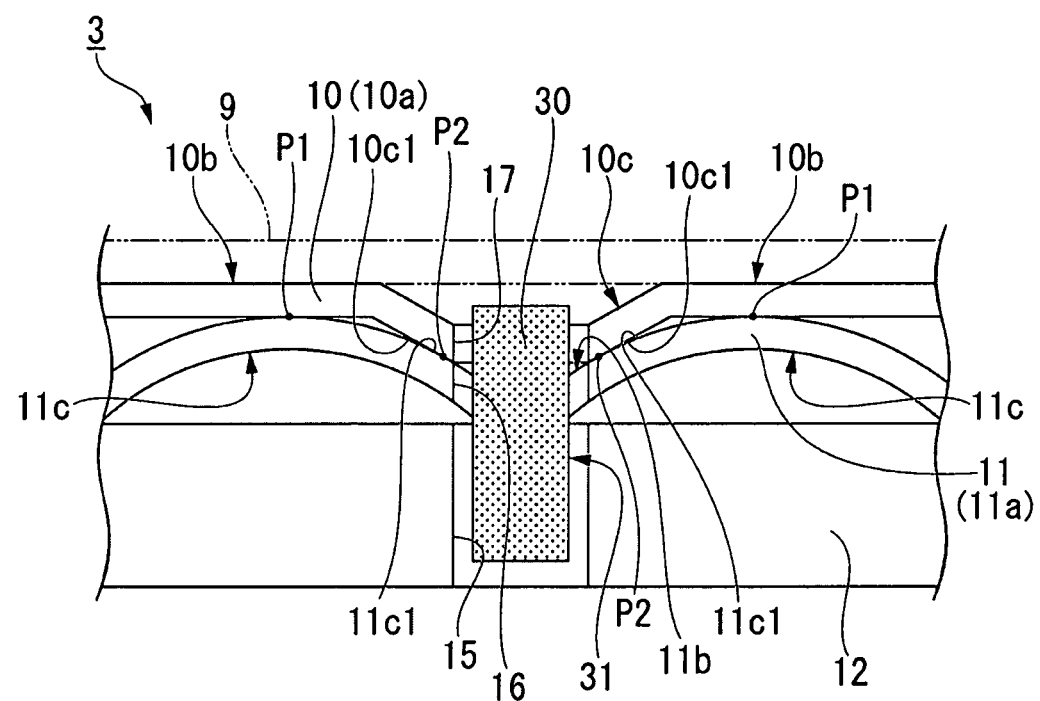
FIG. 6 is an enlarged view of the important part shown in FIG. 5B.

As shown in FIG. 6 that is an enlarged view of an important part shown in FIG. 5B, in a portion in which the engagement member 30 is disposed, the intermediate foil piece 10a and the back foil piece 11a can contact each other at positions between which the engagement member 30 is interposed. That is, in the intermediate foil piece 10a, in addition to a contact point P1 in which the flat portion 10b contacts the peak of the hill part 11c of the back foil piece 11a, a contact point P2 is formed in which the recess 10c contacts a portion other than the peak of the hill part 11c of the back foil piece 11a.

At positions between which a bottom surface 11b1 is interposed as shown in FIG. 4, as shown in FIG. 6, the recess 10c of the intermediate foil piece 10a contacts side surfaces 11c1 of the hill parts 11c of the back foil piece 11a by the engagement member 30. The side surfaces 11c1 are positioned on both sides in the circumferential direction of the peak of the hill part 11c and radially outward compared to the peak. That is, the recess 10c is disposed at a position in the circumferential direction between the peak of one hill part 11c and the peak of a hill part 11c adjacent to the one hill part 11c in the wave sheet shape of the back foil piece 11a.

In other words, the recess 10c is disposed at a position in the circumferential direction corresponding to a portion of the wave sheet shape of the back foil piece 11a between the peak of one hill part 11c and the peak of a hill part 11c adjacent to the one hill part 11c.

The side surface 11c1 of the hill part 11c is a curved surface, and a side-wall surface 10c1 (a contact surface, a radially outer surface of the tapered part) of the recess 10c in contact with the side surface 11c1 is an inclined surface. The separation in the circumferential direction between a pair of side-wall surfaces 10c1 gradually decreases radially outward from the radially inner side thereof. That is, the side surface 11c1 of the hill part 11c and the side-wall surface 10c1 of the recess 10c contact each other at one point of the contact point P2 and are separated from each other at other positions, and energy dissipation easily occurs due to friction at the contact point P2. Thus, two contact points P2 are formed in one engagement member 30.

As shown in FIG. 6, the side surface 11c1 of the hill part 11c is a curved surface bulging radially inward when viewed in the axial direction, but may linearly extend when viewed in the axial direction. The side-wall surface 10c1 of the recess 10c linearly extends when viewed in the axial direction, but may be a curved surface bulging radially outward when viewed in the axial direction. If at least one of the side surface 11c1 and the side-wall surface 10c1 is a curved surface bulging toward the other thereof, these surfaces can contact each other at one contact point and be separated from each other at other positions.

Next, the operation of the radial foil bearing 3 having such a configuration will be described.

In a state where the rotary shaft 1 stops, the top foil 9 is pushed by the back foil 11 (three back foil pieces 11a) via the intermediate foil 10 (three intermediate foil pieces 10a) toward the rotary shaft 1 and thus closely contacts the rotary shaft 1. In addition, in this embodiment, since both ends of the top foil 9 are the thin portions 24, at the thin portions 24, a force (local preload) that clamps the rotary shaft 1 does almost not occur.

Then, when the rotary shaft 1 is started in an arrow P direction in FIG. 2, the rotary shaft 1 starts rotating at a low speed at first, and then gradually accelerates to rotate at a high speed. Then, as shown by an arrow Q in FIG. 2, ambient fluid is drawn in from one end of each of the top foil 9, the intermediate foil 10, and the back foil 11, and flows into a space between the top foil 9 and the rotary shaft 1. As a result, a fluid lubrication film is formed between the top foil 9 and the rotary shaft 1.

The film pressure of the fluid lubrication film acts on the top foil 9 and presses each hill part 11c of the back foil piece 11a via the intermediate foil 10 in contact with the top foil 9. Then, the back foil piece 11a is pressed by the intermediate foil 10 so that the hill part 11c is pressed and expanded, whereby the back foil piece 11a starts moving in the circumferential direction on the bearing housing 12. That is, since the back foil piece 11a (the back foil 11) elastically supports the top foil 9 via the intermediate foil 10, the back foil piece 11a deforms in the circumferential direction when receiving a load from the top foil 9, and accepts flexure of the top foil 9 or the intermediate foil 10 and supports them.

As shown in FIG. 5B, the engagement leg 31 of the engagement member 30 is inserted in and engaged with the cutout 16 provided on the side circumferential edge part of the back foil piece 11a and serves as a rotation stopper with respect to the bearing housing 12. Thus, each hill part 11c of the back foil piece 11a deforms (moves) in the circumferential direction in a state where the cutout 16 with which the engagement member 30 is engaged serves as a fixed point (a fixed end), but the center of the back foil piece 11a does not move from a fixed position.

The back foil piece 11a is affected by the friction between the back foil piece 11a and the bearing housing 12 or the intermediate foil 10 when deforming (moving) in the circumferential direction, and thus easily deforms (moves) at both ends, namely, free end sides thereof, but does not easily deform at the fixed point (the fixed end) side thereof.

Therefore, a difference may occur in the support rigidity of the back foil piece 11a between the free end side and the fixed end side thereof. However, in this embodiment, since the cutout 16 is formed in the central portion in the circumferential direction of the back foil piece 11a, the fixed point by the engagement member 30 is in the central portion in the circumferential direction of the back foil piece 11a, the distance between the fixed end and the free end decreases, and the difference in the support rigidity decreases.

Furthermore, in this embodiment, since the back foil 11 is divided into the three back foil pieces 11a, the distance between the fixed end and the free end decreases compared to a case where the back foil 11 is configured of a single foil, and thus the difference in the support rigidity between the fixed end side and the free end side thereof further decreases.

Even when an unexpected impact or the like acts while the rotary shaft 1 rotates at a high speed, since the engagement member 30 limits the back foil piece 11a from moving in the axial direction, the back foil piece 11a does not drop off the bearing housing 12. Similarly, the intermediate foil piece 10a is provided with the recess 10c in which the connection portion 32 of the engagement member 30 is disposed, the engagement leg 31 of the engagement member 30 is disposed in the cutout 17 formed in the recess 10c, and the intermediate foil piece 10a is engaged with the engagement groove 15 via the engagement member 30, whereby even when an unexpected impact or the like acts, the intermediate foil piece 10a does not rotate inside the bearing housing 12, and is limited from moving in the axial direction inside the bearing housing 12. In addition, since the engagement member 30 is covered with the top foil 9 in the radial direction, the engagement member 30 is limited from dropping off the radial foil bearing 3. As a result, the intermediate foil piece 10a is limited from dropping off the radial foil bearing 3.

The intermediate foil 10 is provided with the recess 10c in which the connection portion 32 of the engagement member 30 can be disposed, and the recess 10c protrudes toward the back foil 11 disposed radially outward, whereby as shown in FIG. 6, the recess 10c contacts the side surfaces 11c1 of the hill parts 11c of the back foil 11 at positions between which the bottom surface 11b1 of the valley part 11b of the back foil 11 is interposed. Therefore, the intermediate foil 10 and the back foil 11 do not contact each other only at the flat portion 10b but also contact at the recess 10c, and the contact area therebetween increases, so that the damping effect due to friction between the intermediate foil 10 and the back foil 11 is improved, and the stability when the rotary shaft 1 rotating at a high speed is supported can be further enhanced.

As shown in FIG. 6, two contact points P2 are formed per one engagement member 30, and in this embodiment, as shown in FIG. 2, the two contact points P2 are formed in each of pairs (three pairs) of the intermediate foil piece 10a and the back foil piece 11a, so that the contact area between the intermediate foil 10 and the back foil 11 can be increased by six contact points P2 in addition to the contact point P1. In addition, the side surface 11c1 of the hill part 11c of the back foil 11 is a curved surface, the side-wall surface 10c1 of the recess 10c contacting the side surface 11c1 is an inclined surface, so that these surfaces contact at one point of the contact point P2 and are separated from each other at other positions. Therefore, the intermediate foil 10 and the back foil 11 do not easily bold each other, and "sliding" therebetween easily occurs.

Second Embodiment

Next, a second embodiment of the radial foil bearing of the present disclosure will be described. In the following description, the same or equal component as or to that of the above-described embodiment is attached with an equal reference sign, and the explanation thereof will be simplified or omitted.

Figure 7A:
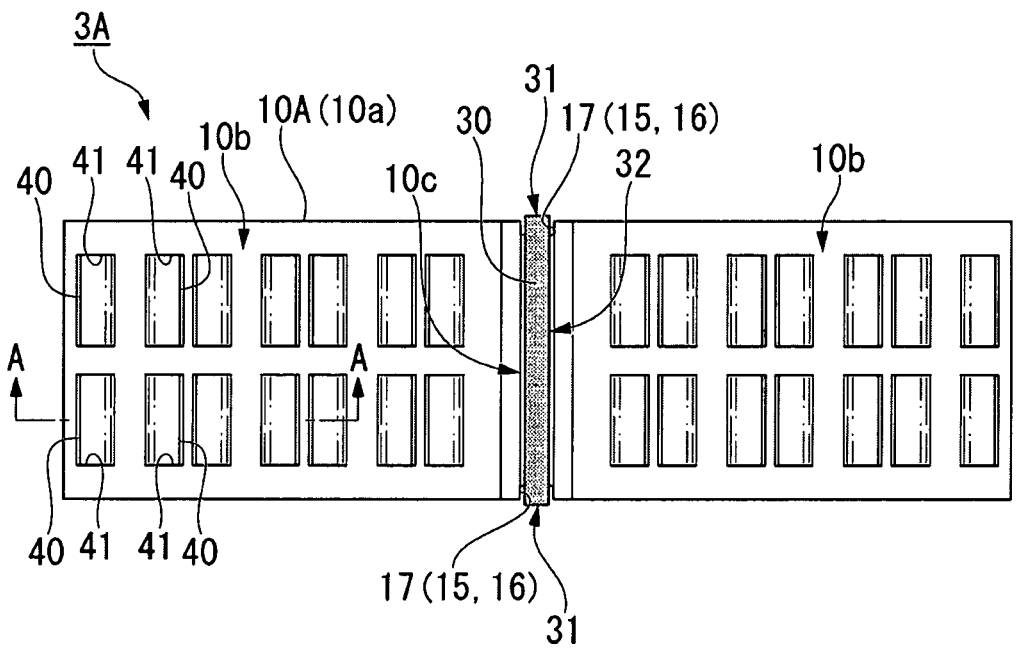
FIG. 7A is a diagram showing a second embodiment of the radial foil bearing of the present disclosure and schematically showing an important part of the radial foil bearing in a flattened manner.
Figure 7B:
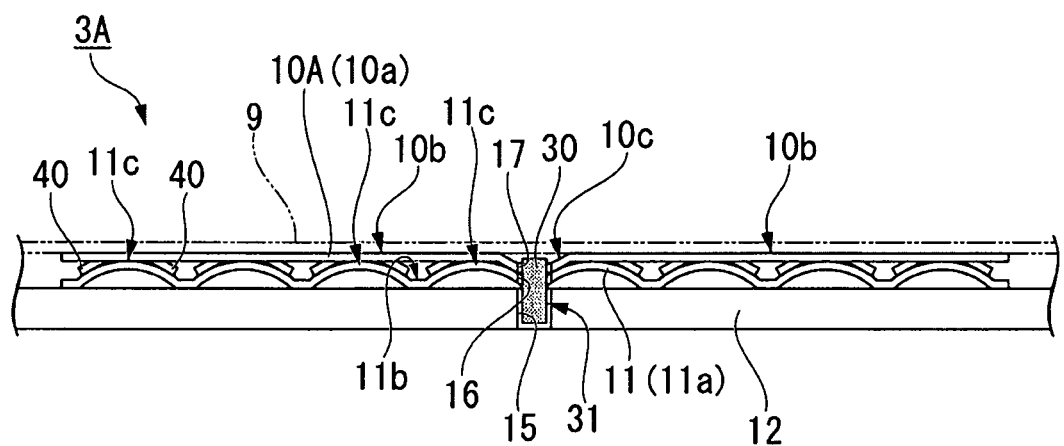
FIG. 7B is a diagram showing the second embodiment of the radial foil bearing of the present disclosure and is a side view showing the important part of the radial foil bearing in a flattened manner.

FIGS. 7A and 7B are diagrams showing a radial foil bearing 3A of the second embodiment applied to the turbo machine shown in FIG. 1, FIG. 7A is a diagram schematically showing an important part of the radial foil bearing 3A in a flattened manner, and FIG. 7B is a side view thereof.

The second embodiment is different from the above-described embodiment in that an intermediate foil 10A (an intermediate foil piece 10a) is provided with branching parts 40 (protruding part) branched off from a flat portion 10b. That is, a portion protruding radially outward is provided in a radially outer surface of the intermediate foil piece 10a.

As shown in FIG. 7A, a slit 41 is formed in the flat portion 10b, and the portion surrounded by the slit 41 is pushed out (cut and raised) so as to protrude radially outward, whereby the branching part 40 is formed. In this embodiment, the slit 41 is formed of two incisions parallel to the circumferential direction, and one incision connecting ends of the two incisions and parallel to the axial direction. The rectangular branching part 40 surrounded by the slit 41 is slantingly pushed out to protrude radially outward. That is, the branching part 40 extends from the ends of the two parallel incisions not connecting to the incision parallel to the axial direction (the ends on far side from the incision parallel to the axial direction).

The branching part 40 separates in the circumferential direction from the above ends not connecting to the incision parallel to the axial direction and separates radially outward. That is, the branching part 40 extends radially outward as it goes in the circumferential direction toward the incision parallel to the axial direction, from the ends of the two parallel incisions on far side from the incision parallel to the axial direction.

In other words, the position of the branching part 40 monotonously changes radially outward as it separates in the circumferential direction from the ends not connecting to the incision parallel to the axial direction. That is, the branching part 40 of this embodiment lineally extends when viewed in the axial direction. The branching part 40 protrudes toward the back foil piece 11a at a position in the circumferential direction between the peak of at least one hill part 11c and the peak of a hill part 11c adjacent to the one hill part 11c in the wave sheet shape of the back foil piece 11a.

As shown in FIG. 7B, a pair of branching parts 40 are provided such that the hill part 11c of the back foil piece 11a is interposed therebetween in the circumferential direction. That is, as shown in FIG. 7A, the slit 41 is formed on each of both sides in the circumferential direction of a portion corresponding to the hill part 11c of the back foil piece 11a, and a pair of branching parts 40 pushed out from these slits 41 extend away from each other. That is, two pairs of incisions parallel to the circumferential direction are provided to overlap the position in the circumferential direction of one hill part 11c, and the two pairs are away from each other in the circumferential direction. The separation in the circumferential direction between the pair of branching parts 40 protruding toward one hill part 11c gradually increases radially outward from the radially inner side thereof. In addition, the incision parallel to the axial direction extend from the ends on the side apart from each other of the two incisions parallel to the circumferential direction. By this configuration, two branching parts 40 are configured such that the hill part is interposed therebetween, both ends thereof in the circumferential direction protrude radially outward, and a portion between the ends is positioned radially inward. As shown in FIG. 7B, two branching parts 40 (a pair of branching parts) provided between which the hill part 11c of the back foil piece 11a is interposed in the circumferential direction are in contact with the hill part 11c of the back foil piece 11a so as to hold the hill part 11c from both sides thereof in the circumferential direction. In this embodiment, as shown in FIG. 7A, the flat portion 10b is provided with the slits 41 in two rows in the circumferential direction, and four branching parts 40 contact one hill part 11c. In addition, the slits 41 (the branching parts 40) may be provided in a single row or in three or more rows in the circumferential direction.

Figure 8:
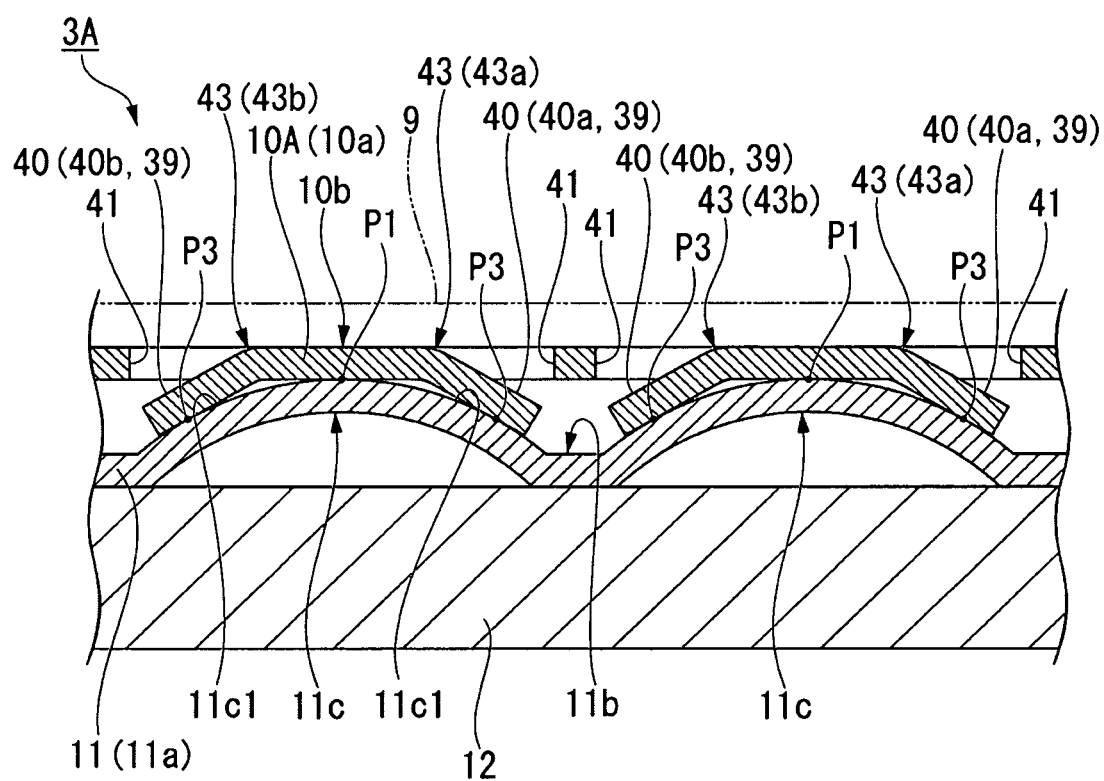
FIG. 8 is an enlarged cross-sectional view taken along line A-A in FIG. 7A.

FIG. 8 shows an enlarged cross-sectional view taken along line A-A of an important part shown in FIG. 7A. The flat portion 10b of the intermediate foil 10 (a portion positioned on a plane and obtained by tracing an approximately circular closed curve surrounded in the circumferential direction and with no branching, in the axial direction width of the intermediate foil 10) is provided with two branching positions 43 from which the branching parts 40 branches off, between the peak of a first hill part 11c (the left hill part 11c shown in FIG. 8) and the peak of a second hill part 11c (the right hill part 11c shown in FIG. 8) adjacent to each other in the circumferential direction of the back foil 11. In addition, in this embodiment, the flat portion 10b is provided with a first branching position 43a (the left branching position 43 shown in FIG. 8) and a second branching position 43b (the right branching position 43 shown in FIG. 8) at a position different from the first branching position 43a, between the peak of the first hill part 11c and the peak of the second hill part 11c. That is, two branching parts 40 are formed between the peak of the first hill part 11c and the peak of the second hill part 11c adjacent to each other in the circumferential direction of the back foil 11. In other words, two (a pair of) branching positions 43 are provided in the circumferential direction between the valley parts 11b adjacent to each other in the circumferential direction. In the radial foil bearing 3 of this embodiment, in a state where the rotary shaft 1 inserted therethrough does not rotate, the intermediate foil piece 10a and the back foil piece 11a are separated from each other in the radial direction at a position sifted in the radial direction from the branching position 43.

That is, in the radial foil bearing 3, in a state where the inserted rotary shaft 1 does not rotate, the intermediate foil piece 10a and the back foil piece 11a are separated from each other in the radial direction at a position equal in the circumferential direction to the branching position 43.

The flat portion 10b faces the hill parts 11c of the back foil 11 in the radial direction. The intermediate foil 10 is provided with a protruding part 39 that protrudes toward the back foil 11 via branching, at a position in the circumferential direction between the peak of a hill part 11c and the peak of another hill part 11c adjacent to the hill part 11c in the wave sheet shape of the back foil 11. The protruding part 39 includes a first branching part 40a extending from the first branching position 43a of the flat portion 10b and a second branching part 40b extending from the second branching position 43b of the flat portion 10b. As shown in FIG. 8, the separation in the circumferential direction between the first branching part 40a and the second branching part 40b positioned between the peaks of two hill parts 11c adjacent to each other in the circumferential direction gradually decreases radially outward from the radially inner side thereof. In this embodiment, both of the first branching part 40a and the second branching part 40b linearly extend when viewed in the axial direction, but may have curved surfaces bulging radially outward.

A pair of branching parts 40, which open in directions away from each other, are in contact with positions (the side surfaces 11c1) between which the peak of the hill part 11c is interposed in the circumferential direction. That is, the intermediate foil piece 10a is provided with contact points P3 in which the branching parts 40 contact portions other than the peaks of the hill parts 11c of the back foil piece 11a, in addition to the contact points P1 in which the flat portion 10b contacts the peaks of the hill parts 11c of the back foil piece 11a.

In addition, in a state where the inserted rotary shaft 1 does not rotate, no contact point may be formed between the two contact points P3 between which the peak of the hill part 11c. Even in this case, when the inserted rotary shaft 1 rotates, the contact point P1 is formed between the two contact points P3 between which the peak of the hill part 11c is interposed. In addition, the radially outer surface of the branching part 40 extends from the peak side of a hill part 11c toward a valley part 11b adjacent to the hill part 11c beyond the contact point P3. However, the radially outer surface thereof does not reach the position in the radial direction of the valley part 11b adjacent to the hill part 11c.

The side surface 11c1 of the hill part 11c is a curved surface, and the branching part 40 in contact with the side surface 11c1 is flat. That is, the side surface 11c1 of the hill part 11c and the branching part 40 contact each other at one point of the contact point P3 and separate from each other at other positions, and thus sliding at the contact point P3 easily occurs.

According to the second embodiment having the above configuration, the first branching position 43a and the second branching position 43b at which the branching parts 40 (the first branching part 40a and the second branching part 40b) branch off from the flat portion 10b are provided between the peak of the first hill part 11c and the peak of the second hill part 11c adjacent to each other in the circumferential direction of the back foil 11, and as shown in FIG. 8, the branching parts 40 contact positions other than the peak of the hill part 11c of the back foil 11. Therefore, the intermediate foil 10A and the back foil 11 do not contact each other only at the flat portion 10b and the recess 10c but also at the branching part 40Branched off from the flat portion 10b, and the number of the contact positions therebetween increases, so that the damping effect due to the friction between the intermediate foil 10A and the back foil 11 is enhanced. That is, two contact points P3 are further formed per one hill part 11c.

Since a pair of branching parts 40 are provided such that the hill part 11c of the back foil 11 is interposed therebetween in the circumferential direction, even when the back foil 11 deforms so as to extend or shrink in the circumferential direction, the contact state with respect to the hill part 11c can always be maintained, and the damping effect due to the friction between the intermediate foil 10A and the back foil 11 can be enhanced.

Third Embodiment

Next, a third embodiment of the radial foil bearing of the present disclosure will be described. In the following description, the same or equal component as or to that of the first or second embodiment is attached with an equal reference sign, and the explanation thereof will be simplified or omitted.

Figure 9A:
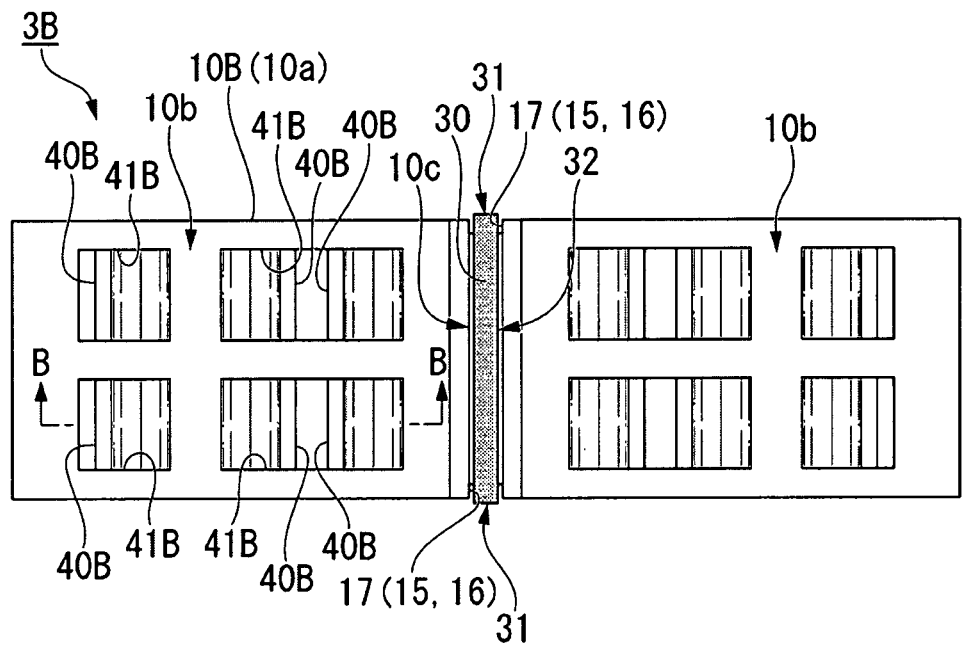
FIG. 9A is a diagram showing a third embodiment of the radial foil bearing of the present disclosure and schematically showing an important part of the radial foil bearing in a flattened manner.
Figure 9B:
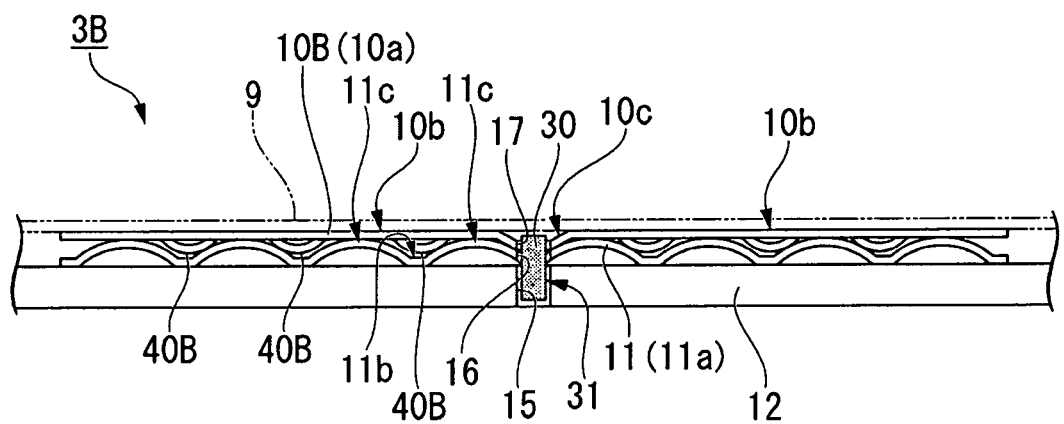
FIG. 9B is a diagram showing the third embodiment of the radial foil bearing of the present disclosure and is a side view showing the important part of the radial foil bearing in a flattened manner.

FIGS. 9A and 9B are diagrams showing a radial foil bearing 3B of the third embodiment applied to the turbo machine shown in FIG. 1, FIG. 9A is a diagram schematically showing an important part of the radial foil bearing 3B in a flattened manner, and FIG. 9B is a side view thereof.

The third embodiment is different from the first and second embodiments in that an intermediate foil 10B (an intermediate foil piece 10a) is provided with a branching part 40B (a protruding part) branched off from a flat portion 10b.

As shown in FIG. 9A, the branching part 40B is formed by forming a slit 41B in the flat portion 10b and pushing out the portion surrounded by the slit 41B so as to protrude radially outward. That is, the branching part 40B of this embodiment protrudes radially outward from the flat portion 10b in the circumferential direction and further extends radially inward beyond the peak of protruding. In this embodiment, the slit 41B is formed in an H-shape, and two branching parts 40B formed by the slit 41B bulge in a curved shape so as to protrude radially outward, thereby forming a wave shape. That is, when viewed in the radial direction (refer to FIG. 9A), the branching parts 40B extend from the sides at both ends in the circumferential direction of a rectangular area in which the H-shaped slit 41B is disposed, toward the sides at the ends opposite thereto. The tips of the two branching parts 40B separates from each other in the circumferential direction.

As shown in FIG. 9B, the branching part 40B is disposed at a position corresponding to the valley part 11b of the back foil piece 11a. That is, the branching part 40B includes a position facing the valley part 11b in the radial direction and extends to each of the hill parts 11c adjacent to both sides of the valley part 11b in the circumferential direction. However, the tip of the branching part 40B is positioned to be closer to the valley part 11b than the peak of the hill part 11c. Therefore, the branching part 40B extends from one hill part 11c to a position in the circumferential direction of a hill part 11c adjacent to the one hill part 11c. As shown in FIG. 9A, the central portion of the slit 41B has an area in which the back foil 11 is exposed when viewed in a radial direction. Through the exposing area, the position corresponding to the peak of the hill part 11c of the back foil piece 11a is exposed. The pair of branching parts 40B cut and raised from the slit 41B are deformed in curved surfaces so as to separate from each other, and as shown in FIG. 9B, the branching parts 40B contact hill parts 11c disposed on both sides of a hill part 11c disposed at a position corresponding to the center of the slit 41B. That is, a hill part 11c held from both sides thereof in the circumferential direction by the branching parts 40B and a hill part 11c not held from both sides thereof in the circumferential direction by the branching parts 40B are alternately arranged in the circumferential direction. In other words, the peak of the hill part 11c of the back foil piece 11a and the peak of the branching part 40B alternately appear in the circumferential direction. In further other words, peaks of one branching part 40B are provided between the top of one hill part 11c and the tops of hill parts 11c adjacent to the one hill part 11c. In addition, the "peak" described above denotes a peak of a radial direction position, namely, a portion that protrudes radially outward.

Figure 10:
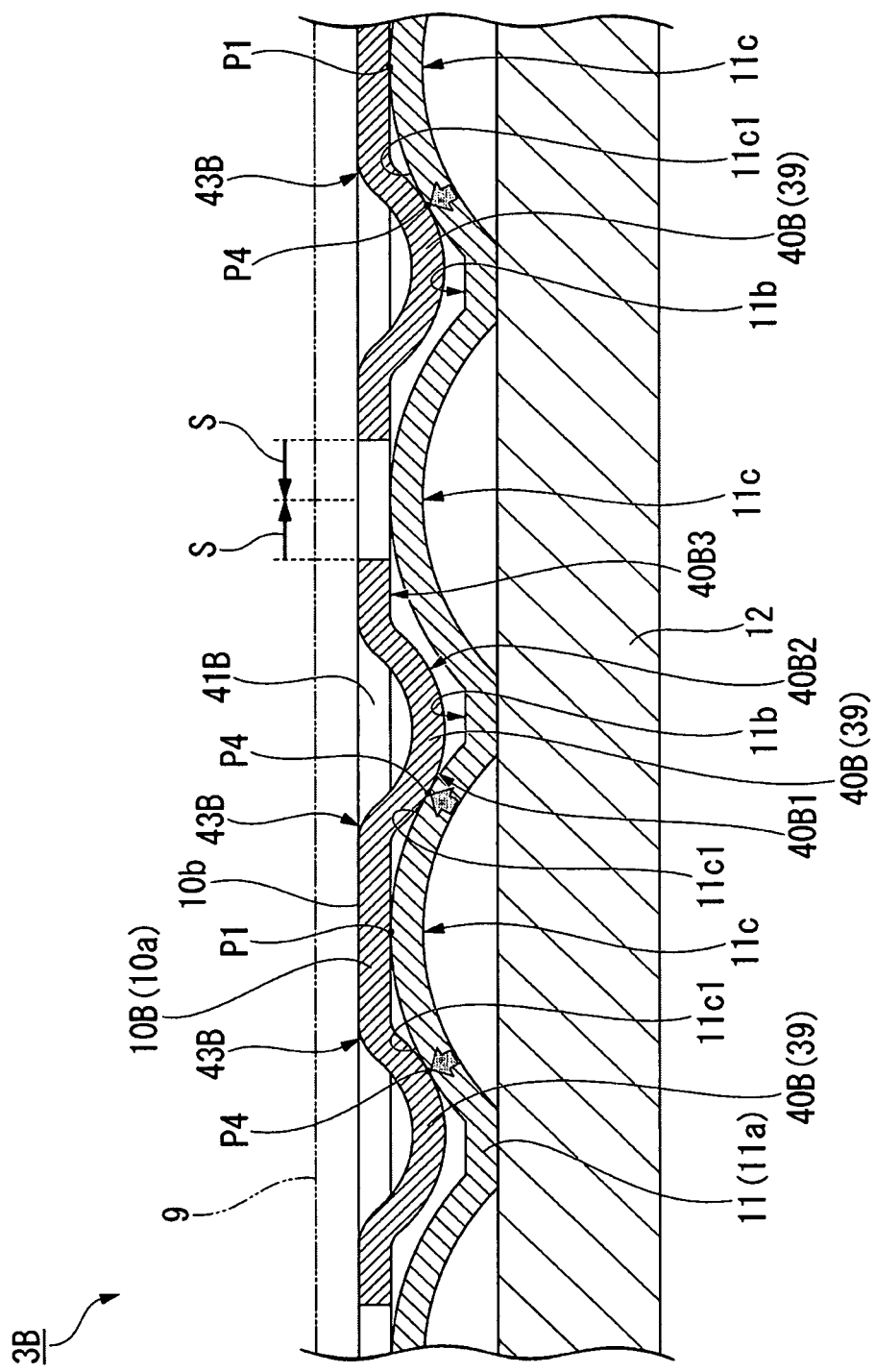
FIG. 10 is an enlarged cross-sectional view taken along line B-B in FIG. 9A.

As shown in FIG. 10 that is an enlarged cross-sectional view taken along line B-B of an important part shown in FIG. 9A, the flat portion 10b is provided with a branching position 43B (a first branching position) from which the branching part 40B branches off, between the top of a first hill part 11c and the top of a second hill part 11c adjacent to each other in the circumferential direction of the back foil 11. That is, one branching part 40B (a first branching part) is formed between the top of the first hill part 11c and the top of the second hill part 11c adjacent to each other in the circumferential direction of the back foil 11. The protruding part 39 of this embodiment includes the branching part 40B. The branching part 40B includes a separating part 40B1 that separates radially outward from the flat portion 10b, an approaching part 40B2 that extends from the separating part 40B1 (the radially outer end of the separating part 40B1) and approaches radially inward and toward the flat portion 10b, and an end part 40B3 that extends from the approaching part 40B2 (the radially inner end of the approaching part 40B2) along the flat portion 10b. The separating part 40B1 and the approaching part 40B2 have smoothly curved shapes with an equal radius of curvature. That is, the separating part 40B1 and the approaching part 40B2 are formed in a curved surface bulging radially outward as a whole. In addition, each of the separating part 40B1 and the approaching part 40B2 may be configured by combining a linear shape and another linear shape or by combining a linear shape and a curved shape, when viewed in the axial direction.

The separating part 40B1 of the branching part 40B is in contact with the side surface 11c1 of the hill part 11c. That is, the intermediate foil piece 10a is provided with a contact point P4 at which the separating part 40B1 of the branching part 40B contacts a portion other than the top of the hill part 11c of the back foil piece 11a, in addition to the contact point P1 at which the flat portion 10b contacts the top of the hill part 11c of the back foil piece 11a. The side surface 11c1 of the hill part 11c is a curved surface, and the separating part 40B1 of the branching part 40B in contact with the side surface 11c1 is a curved surface that is convex toward the side surface 11c1. That is, the side surface 11c1 of the hill part 11c and the separating part 40B1 of the branching part 40B contact each other at one point of the contact point P4 and separate from each other at other positions, and thus sliding at the contact point P4 easily occurs. In other words, in this embodiment, contact points P4 are formed by two branching parts 40B between which the top of one hill part 11c is interposed in the circumferential direction. On the other hand, a hill part 11c adjacent to the above hill part 11c has no contact point with respect to the branching part 40B. In addition, the length from the contact point P4 to the tip of the branching part 40B is greater than the length between the branching position 43B of the branching part 40B and the contact point P4. That is, in this embodiment, the length from the contact point P4 to the tip of the branching part 40B is greater than the length to the contact point P4 from the top of a hill part 11P interposed between the contact points P4.

According to the third embodiment having the above configuration, the branching position 43B at which the branching part 40B branches off from the flat portion 10b is provided between the top of the first hill part 11c and the top of the second hill part 11c adjacent to each other in the circumferential direction of the back foil 11, and as shown in FIG. 10, the branching part 40B is in contact with a position other than the top of the hill part 11c of the back foil 11. Therefore, the intermediate foil 10B and the back foil 11 do not contact each other only at the flat portion 10b and the recess 10c but also at the branching part 40B branched off from the flat portion 10b, and the number of the contact positions therebetween increases, so that the damping effect due to the friction between the intermediate foil 10B and the back foil 11 is enhanced.

Since a pair of branching parts 40B are provided such that every other hill part 11c is interposed, even when the back foil 11 deforms so as to extend or shrink in the circumferential direction, the branching parts 40B can contact the hill part 11c. In addition, the branching part 40B has a wave sheet shape including the separating part 40B1 that separates radially outward from the flat portion 10b, and the approaching part 40B2 that extends from the separating part 40B1 and approaches radially inward and toward the flat portion 10b, and when the back foil 11 deforms in the circumferential direction, the branching part 40B is pushed by the hill part 11c and causes sliding (namely, extends in the circumferential direction) as shown by a reference sign S in FIG. 10, similar to the back foil 11 (a bump foil).

At this time, "sliding" can also occur between the end part 40B3 of the branching part 40B and the top foil 9, and the damping effect due to friction is further enhanced.

Fourth Embodiment

Next, a fourth embodiment of the radial foil bearing of the present disclosure will be described. In the following description, the same or equal component as or to that of the above-described embodiments is attached with an equal reference sign, and the explanation thereof will be simplified or omitted.

Figure 11:
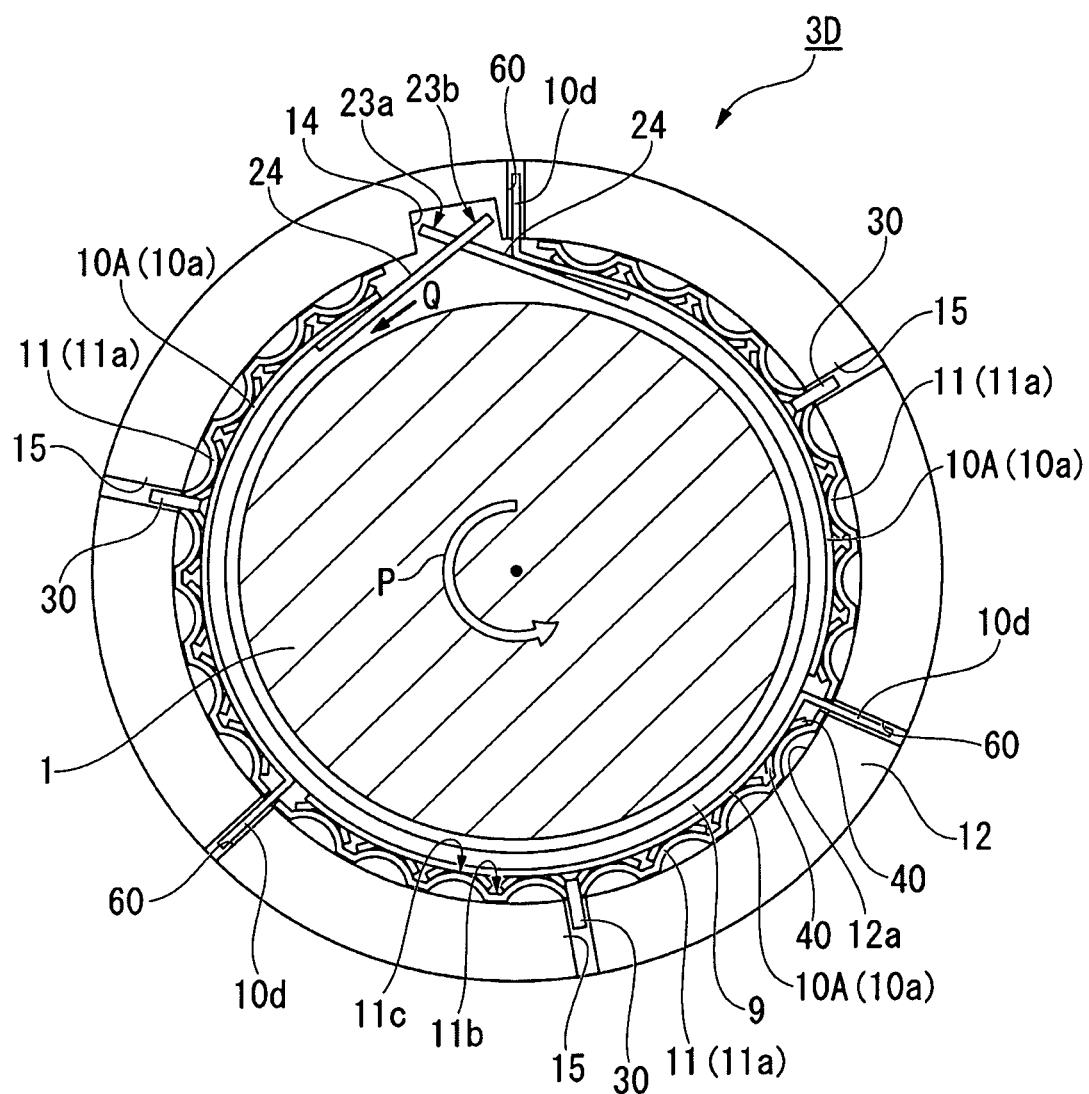
FIG. 11 is a diagram showing a fourth embodiment of the radial foil bearing of the present disclosure.

FIG. 11 is a diagram showing a radial foil bearing 3D of the fourth embodiment applied to the turbo machine shown in FIG. 1.

The fourth embodiment is different from the first to third embodiments in that both side surfaces of a bearing housing 12 are provided with engagement grooves 60 for allowing intermediate foil pieces 10a to engage therewith, and the intermediate foil piece 10a is provided with engagement protrusions 10d that engage with the engagement grooves 60. In addition, the radial foil bearing 3D of the fourth embodiment includes an intermediate foil 10A having a configuration similar to that of the second embodiment.

As shown in FIG. 11, the intermediate foil piece 10a is fixed to a different position from that of the back foil piece 11a. The engagement groove 60 is formed in a groove shape extending from the outer peripheral edge to the inner peripheral edge of the bearing housing 12. A pair of engagement grooves 60 are formed on both side surfaces of the bearing housing 12 so as to face each other in the axial direction. In this embodiment, three pairs of engagement grooves 60 having this configuration are formed in total, and the engagement grooves 60 are formed at positions that divide the side surface of the bearing housing 12 into approximately three areas in the circumferential direction. The engagement grooves 60 are disposed to be sifted by a half pitch with respect to the above-described engagement grooves 15. The engagement grooves 60 can be machined by wire-cut electric discharge machining. In addition, the engagement grooves 60 may be formed by cutting machining using an end mill or the like.

Both ends of one short side of the intermediate foil piece 10a are provided with projecting parts, and these projecting parts are bent at an approximately right angle, whereby the engagement protrusions 10d are formed. The engagement protrusions 10d formed in this way engage with the engagement grooves 60 of the bearing housing 12 through the gap formed between the back foil pieces 11a adjacent to each other in the circumferential direction, and thus each intermediate foil piece 10a is held on the bearing housing 12 in a state of covering a back foil piece 11a. In the intermediate foil piece 10a held on the bearing housing 12 in this way, in particular, the engagement protrusions 10d formed on both sides thereof engage with the engagement grooves 60 such that both side surfaces of the bearing housing 12 are held therebetween. Therefore, even when an unexpected external force due to shaft vibration or the like of the rotary shaft 1 is applied to the radial foil bearing 3, the intermediate foil piece 10a does not rotate inside the bearing housing 12 and further does not move in the axial direction inside the bearing housing 12, and thus the intermediate foil piece 10a is prevented from dropping off the bearing housing 12.

Unlike the intermediate foil piece 10a of the above second embodiment, the intermediate foil piece 10a of this embodiment is not provided with the recess 10c. That is, the engagement member 30 is disposed between the intermediate foil piece 10a and the back foil piece 11a and is used for fixing the back foil piece 11a to the bearing housing 12.

In the fourth embodiment having the above configuration, the contact area between the intermediate foil 10A and the back foil 11 also increases by forming the branching part 40 in the intermediate foil piece 10a, so that the damping effect due to friction between the intermediate foil 10A and the back foil 11 is enhanced, and the stability in a case of supporting the rotary shaft 1 rotating at a high speed can be further improved.

Hereinbefore, although the embodiments of the present disclosure have been described with reference to the attached drawings, the present disclosure is not limited to the above embodiments. The shapes, combinations, and the like of the components described in the above embodiments are merely examples, and addition, omission, replacement, and other modifications of the configuration can be adopted based on design requirements and the like within the scope of the present disclosure.

For example, the configuration and number of grooves and retainers for holding the top foil 9, the intermediate foil 10, and the back foil 11 are not limited to the above embodiments, and various configurations may be adopted therefor.

Although the bearing housing 12 is formed in a cylindrical shape in the above embodiments, one side surface or both side surfaces of the bearing housing may be provided integrally with an annular flange, thereby forming the housing in an approximately cylindrical shape as a whole. By forming the flange, the bearing can be easily attached to a housing or the like of a turbo machine.

The invention claimed is:

1. A radial foil bearing, comprising:
   a wave sheet-shaped back foil; and
   an intermediate foil supported by the back foil,
   wherein
   the intermediate foil includes
   a flat portion facing a hill part of the wave sheet-shaped back foil, and
   a protruding part protruding toward the back foil via branching at a position in a circumferential direction between a top of at least one hill part and a top of another hill part adjacent to the one hill part in the wave sheet-shaped back foil, and
   the protruding part is partially surrounded by a slit formed in the intermediate foil and is pushed out to protrude radially outward.

2. The radial foil bearing according to claim 1, wherein
   the flat portion of the intermediate foil is provided with a first branching position at a position in the circumferential direction between the top of the one hill part and the top of the other hill part adjacent to the one hill part in the wave sheet-shaped back foil,
   the protruding part includes a first branching part extending from the first branching position, and
   the first branching part is partially surrounded by the slit formed in the intermediate foil and is pushed out to protrude radially outward.

3. The radial foil bearing according to claim 2, wherein
   the flat portion of the intermediate foil is provided with a second branching position, different from the first branching position, at a position in the circumferential direction between the top of the one hill part and the top of the other hill part adjacent to the one hill part in the wave sheet-shaped back foil, the protruding part includes a second branching part extending from the second branching position, and the second branching part is partially surrounded by the slit formed in the intermediate foil and is pushed out to protrude radially outward.

4. The radial foil bearing according to claim 2, wherein the first branching part includes
- a separating part separating radially outward from the flat portion, and
- an approaching part extending from the separating part and approaching radially inward toward the flat portion.

5. The radial foil bearing according to claim 1, wherein the flat portion of the intermediate foil is provided with a pair of branching positions, a first branching position of the pair of branching positions being at a position in the circumferential direction between the top of the one hill part and the top of the other hill part on one of two sides of the one hill part, and a second branching position of the pair of branching positions being at a position in the circumferential direction between the top of the one hill part and a top of further another hill part adjacent to the one hill part on the other of the two sides of the one hill part, in the wave sheet-shaped back foil, the protruding part includes a pair of branching parts extending from the pair of branching positions, and each of the pair of branching parts is partially surrounded by the slit formed in the intermediate foil and is pushed out to protrude radially outward.

\* \* \* \* \*